(12) United States Patent
Oishi

(10) Patent No.: US 11,503,169 B2
(45) Date of Patent: Nov. 15, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Tadahiro Oishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/320,231

(22) Filed: May 14, 2021

(65) Prior Publication Data
US 2022/0103704 A1 Mar. 31, 2022

(30) Foreign Application Priority Data
Sep. 30, 2020 (JP) .............................. JP2020-164810

(51) Int. Cl.
| | | |
|---|---|---|
| *H04N 1/00* | (2006.01) | |
| *H04N 1/21* | (2006.01) | |
| *H04N 1/32* | (2006.01) | |
| *H04N 1/44* | (2006.01) | |

(52) U.S. Cl.
CPC ....... *H04N 1/00395* (2013.01); *H04N 1/2166* (2013.01); *H04N 1/32101* (2013.01); *H04N 1/444* (2013.01); *H04N 1/4413* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2010/0024020 | A1* | 1/2010 | Baugher | H04M 1/72469 726/7 |
| 2010/0306842 | A1* | 12/2010 | Asano | H04L 63/105 726/19 |

(Continued)

FOREIGN PATENT DOCUMENTS

| | | | | |
|---|---|---|---|---|
| JP | 2002344484 | * | 11/2002 | ............. G06F 13/00 |
| JP | 2009187183 | * | 8/2009 | ............. G06F 15/00 |

(Continued)

*Primary Examiner* — Beniyam Menberu
(74) *Attorney, Agent, or Firm* — JCIPRNET

(57) ABSTRACT

An information processing apparatus includes a processor configured to: store document data, a first character string, and a second character string that are associated with each other, the second character string being to be inputted by an operation that has a procedure quantity smaller than a procedure quantity of an operation by which a user inputs the first character string; output the document data that is associated with the second character string to a requester of the document data when the second character string is acquired if a predetermined condition is satisfied; avoid outputting the document data that is associated with the second character string to the requester of the document data when the second character string is acquired if the condition is not satisfied; and output the document data that is associated with the first character string to the requester of the document data when the first character string is acquired if the condition is not satisfied.

20 Claims, 6 Drawing Sheets

(56) References Cited

U.S. PATENT DOCUMENTS

| | | | | |
|---|---|---|---|---|
| 2011/0292445 A1* | 12/2011 | Kato | ................... | G06F 3/1292 |
| | | | | 358/1.15 |
| 2015/0046969 A1* | 2/2015 | Abuelsaad | .............. | H04L 63/20 |
| | | | | 726/1 |
| 2016/0050209 A1* | 2/2016 | Govande | ............... | H04L 63/101 |
| | | | | 726/7 |
| 2016/0294804 A1* | 10/2016 | Yamahara | ............. | H04L 63/102 |
| 2017/0063852 A1* | 3/2017 | Azar | ..................... | G06V 40/70 |
| 2018/0032848 A1* | 2/2018 | Ono | ..................... | G06F 3/1285 |
| 2020/0409687 A1* | 12/2020 | Rouland | .............. | H04L 9/3247 |

FOREIGN PATENT DOCUMENTS

| | | | | | |
|---|---|---|---|---|---|
| JP | 2009212764 | * | 9/2009 | ............... | G06F 3/12 |
| JP | 2011013891 | * | 1/2011 | ............... | G06F 3/12 |
| JP | 2011199337 | | 10/2011 | | |
| JP | 2015099523 | * | 5/2015 | ............. | G06F 21/31 |
| KR | 20130022412 | * | 3/2013 | ............... | G06F 3/12 |

\* cited by examiner

| RESERVATION NUMBER | DOCUMENT DATA ID | REGISTER DATE AND TIME |
|---|---|---|
| jiosa545sij2k | f001 | 10:00 5/1/2020 |
| dslojkjdlr5d3 | f002 | 11:42 5/1/2020 |
| ... | ... | ... |
| ... | ... | ... |

123

| | SIMPLE OUTPUT CONDITION | SIMPLE RULE | SIMPLE RESERVATION NUMBER |
|---|---|---|---|
| → | OUTPUT AT 10:00 - 13:00 ON REGISTER DATE | LAST FOUR DIGITS OF RESERVATION NUMBER | ij2k |
| → | WITHIN 30 MINUTES AFTER REGISTER | LAST FOUR DIGITS OF RESERVATION NUMBER | r5d3 |
| → | ... | ... | ... |
| → | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-164810 filed Sep. 30, 2020.

BACKGROUND

(i) Technical Field

The present disclosure relates to an information processing apparatus and a non-transitory computer readable medium.

(ii) Related Art

In a known service, a user registers document data in a data storing apparatus on a network by using a user terminal such as a personal computer, and a printer that is installed in a convenience store, for example, acquires the document data via the network after user authentication and prints the document data out. Japanese Unexamined Patent Application Publication No. 2011-199337 discloses that document data and identification information about a user who registers the document data are associated with each other in advance, and a password that is inputted when the document data is read is made simple.

SUMMARY

Aspects of non-limiting embodiments of the present disclosure relate to a case where an operation for using document data via a communication line is conducted, and a configuration that enables the operation load of a user to be reduced is provided unlike a case where a predetermined operation needs to be conducted regardless of whether a specific condition is satisfied.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: store document data, a first character string, and a second character string that are associated with each other, the second character string being to be inputted by an operation that has a procedure quantity smaller than a procedure quantity of an operation by which a user inputs the first character string; output the document data that is associated with the second character string to a requester of the document data when the second character string is acquired if a predetermined condition is satisfied; avoid outputting the document data that is associated with the second character string to the requester of the document data when the second character string is acquired if the condition is not satisfied; and output the document data that is associated with the first character string to the requester of the document data when the first character string is acquired if the condition is not satisfied.

BRIEF DESCRIPTION OF THE DRAWINGS

An exemplary embodiment of the present disclosure will be described in detail based on the following figures, wherein.

DETAILED DESCRIPTION

Exemplary Embodiment

Configuration of Information Processing System

Figure 1:
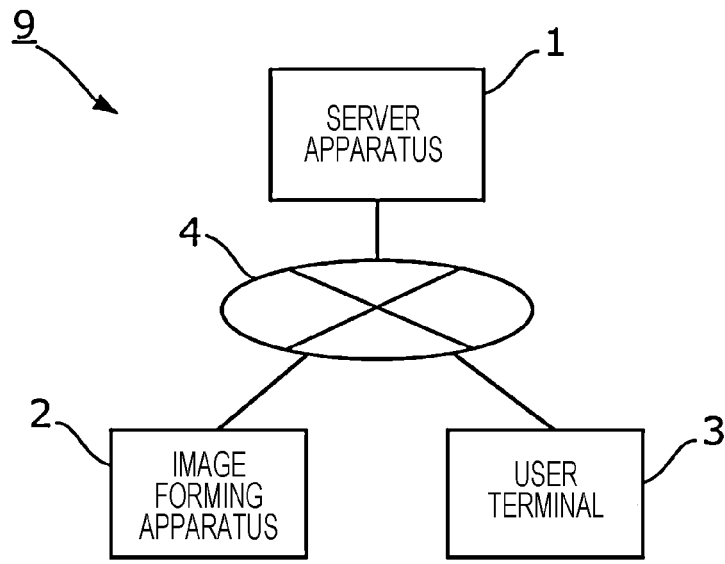
FIG. 1 illustrates an example of the entire configuration of an information processing system.

FIG. 1 illustrates an example of the entire configuration of an information processing system 9. The information processing system 9 illustrated in FIG. 1 is used to store document data acquired by scanning an image of a document containing characters or a figure in a device on a communication line and to use the document data via the communication line. As illustrated in FIG. 1, the information processing system 9 includes a server apparatus 1, an image forming apparatus 2, a user terminal 3, and a communication line 4.

The server apparatus 1 corresponds to an example of an information processing apparatus according to an exemplary embodiment of the disclosure and is a computer that stores and outputs the document data.

The image forming apparatus 2 corresponds to an example of an image forming apparatus according to the exemplary embodiment of the disclosure and forms an image depending on the document data on a medium such as paper. The image forming apparatus 2 may be an apparatus called a printer or may be a so-called multifunction peripheral into which an image reading apparatus, an image forming apparatus, a facsimile, and a copying machine, for example, are integrated.

The user terminal 3 is an apparatus that corresponds to an example of a user terminal according to the exemplary embodiment of the disclosure and is a computer that is used to generate document data and to register the document data in the server apparatus 1 by a user. Examples of the user terminal 3 include a personal computer, a smartphone, and a tablet.

The communication line 4 connects the server apparatus 1, the image forming apparatus 2, and the user terminal 3 such that these are capable of communicating with each other. Examples of the communication line 4 may include a local area network (LAN), a wide area network (WAN), the internet, and a combination thereof. The communication line 4 may include, for example, a public switched telephone network (PSTN) or an integrated services digital network (ISDN).

In the information processing system 9, the number of the server apparatus 1, the number of the image forming apparatus 2, the number of the user terminal 3, and the number of the communication line 4 are not limited to the numbers of those illustrated in FIG. 1. For example, the server apparatus 1 may be configured by a cluster system in which multiple apparatuses share functions.

As for a system in which a user registers document data in a server apparatus by using a user terminal, and the document data is outputted from a freely selected image forming apparatus, the server apparatus typically authenticates the user when the image forming apparatus is used. In recent years, a system that does not need user authentication has appeared in order to increase user convenience. Such a system issues an identifier called a reservation number that is associated with the document data when the server apparatus registers the document data and notifies the user of the issued reservation number by a method that only the user knows. When the document data is outputted from a freely selected image forming apparatus by the user, the reservation number is specified in the server apparatus. That is, the reservation number serves as information for specifying the document data and information for confirming that the user is proper. At this time, a case where the reservation number is represented by a very short character string carries a risk of leakage of the document data to a third person other than the proper user. However, there is a possibility that a case where the reservation number is represented by a very long character string loses user convenience, which is to be achieved even by sacrificing user registration. In view of this, the exemplary embodiment allows the user to use the document data in a manner in which the user inputs a simple reservation number if a predetermined condition is satisfied.

Hardware Configuration of Server Apparatus 1

Figure 2:
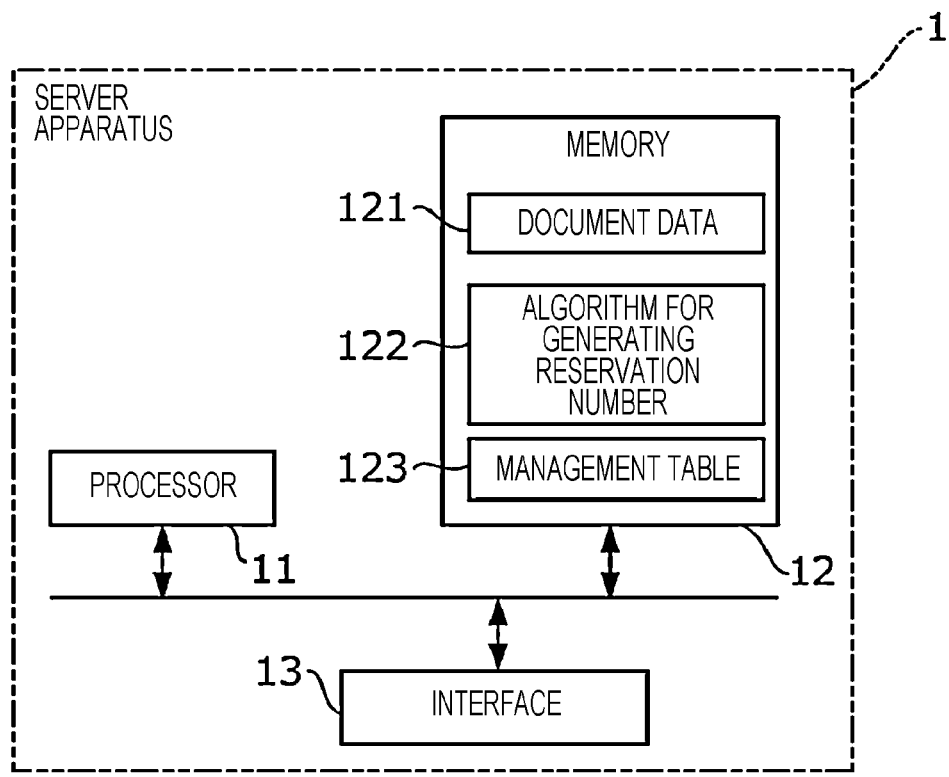
FIG. 2 illustrates an example of the hardware configuration of a server apparatus.

FIG. 2 illustrates an example of the configuration of the server apparatus 1. The server apparatus 1 illustrated in FIG. 2 includes a processor 11, a memory 12, and an interface 13. That is, the server apparatus 1 corresponds to an example of an information processing apparatus that includes a memory and a processor. These components are connected to each other by using, for example, a bus so as to be capable of communicating with each other.

The processor 11 controls the components of the server apparatus 1 by reading and running a program that is stored in the memory 12. An example of the processor 11 is a central processing unit (CPU).

The interface 13 is a communication circuit that connects the server apparatus 1 to the image forming apparatus 2 or the user terminal 3 with a wired cable or wirelessly via the communication line 4 such that these are capable of communicating with each other.

The memory 12 is a storage unit that stores, for example, an operating system, various programs, and data that are read by the processor 11. The memory 12 includes a random access memory (RAM) and a read only memory (ROM). The memory 12 may include, for example, a solid state drive and/or a hard disk drive. The memory 12 stores document data 121, an algorithm 122 for generating the reservation number, and a management table 123.

The document data 121 is generated by the user terminal 3, is transmitted from the user terminal 3 via the communication line 4, and is registered in the server apparatus 1. An example of the algorithm 122 for generating the reservation number is an algorithm for generating the predetermined number of random character strings. The document data 121 is associated with a character string that is generated by the algorithm 122 for generating the reservation number as the reservation number and is stored in the memory 12.

Figures 3, 4:
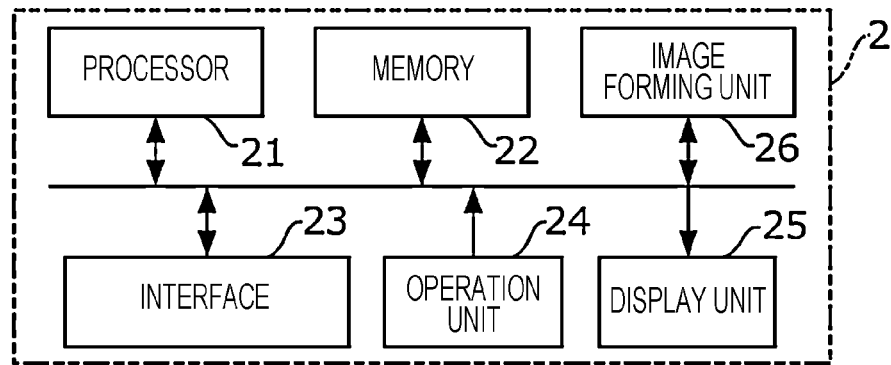
FIG. 3 illustrates an example of the hardware configuration of an image forming apparatus.
FIG. 4 illustrates an example of a management table.

FIG. 4 illustrates an example of the management table 123. The management table 123 illustrated in FIG. 4 includes records each containing: the reservation number (an example of a first character string according to the exemplary embodiment of the disclosure), document data ID that is the identifier of the document data such as a document data name, the register date and time of the document data, a simple output condition in which the document data is outputted when a simple reservation number (an example of a second character string according to the exemplary embodiment of the disclosure) is inputted by an operation that has a procedure quantity smaller than the procedure quantity of an operation by which the user inputs the reservation number, a simple rule that is a rule when the simple reservation number is generated from the reservation number, and the simple reservation number that is generated in accordance with the simple rule. In an example in FIG. 4, the reservation number that is associated with the document data of the document data ID "f001" is "jiosa545sij2k", the simple rule is the last four digits of the reservation number, and the simple reservation number is "ij2k". Similarly, the reservation number that is associated with the document data of the document data ID "f002" is "dslojkjdlr5d3", the simple rule is the last four digits of the reservation number, and the simple reservation number is "r5d3".

The simple output condition is an example of a condition that is determined according to the exemplary embodiment of the disclosure. A condition related to a date or a time on or at which the document data is outputted is used as an example thereof according to the exemplary embodiment, although various conditions are thought. In the example in FIG. 4, the simple output condition that is associated with the document data of the document data ID "f001" is "10:00-13:00 on the register date". Accordingly, in the case where the user requests the output of the document data at "10:00-13:00" on the register date "May 1, 2020" by using the user terminal 3, the document data is outputted by inputting the simple reservation number "ij2k". In the case where the user requests the output of the document data with a timing except for "10:00-13:00" on the register date "May 1, 2020" by using the user terminal 3, however, the document data is not outputted by inputting the simple reservation number "ij2k", but the document data is outputted by inputting the reservation number "jiosa545sij2k". The simple output condition that is associated with the document data of the document data ID "f002" is "within 30 minutes after register. Accordingly, in the case where the user requests the output of the document data within 30 minutes after the register date and time "11:42 on May 1, 2020" by using the user terminal 3, the document data is outputted by inputting the simple reservation number "r5d3". In the case where the user requests the output of the document data when 30 minutes has passed after the register date and time "11:42 on May 1, 2020" by using the user terminal 3, the document data is not outputted by inputting the simple reservation number "r5d3", but the document data is outputted by inputting the reservation number "dslojkjdlr5d3". In the example that is thought, the date or time is used as the condition, for example, the input of the simple reservation number is accepted, and the document data is outputted if it is the specific date or time as described above.

Hardware Configuration of Image Forming Apparatus 2

FIG. 3 illustrates an example of the configuration of the image forming apparatus 2. The image forming apparatus 2 illustrated in FIG. 3 includes a processor 21, a memory 22, an interface 23, an operation unit 24, a display unit 25, and an image forming unit 26. These components are connected to each other by using, for example, a bus so as to be capable of communicating with each other.

The processor 21 controls the components of the image forming apparatus 2 by reading and running a program that is stored in the memory 22. An example of the processor 21 is a CPU.

The memory 22 is a storage unit that stores, for example, an operating system, various programs, and data that are read by the processor 21. The memory 22 includes a RAM and a ROM.

The interface 23 is a communication circuit that connects the image forming apparatus 2 to the server apparatus 1 or another apparatus with a wired cable or wirelessly via the communication line 4 such that these are capable of communicating with each other.

The operation unit 24 includes operators such as an operation button for various instructions, a keyboard, a touch screen, and a mouse, accepts an operation, and transmits a signal depending on the content of the operation to the processor 21.

The display unit 25 includes a display screen such as a liquid-crystal display and displays an image under control of the processor 21. A transparent touch screen of the operation unit 24 may be stacked on the display screen.

The image forming unit 26 forms an image on a medium by using, for example, an electrophotographic system.

The user terminal 3 includes a processor, a memory, an interface, an operation unit, and a display unit as in the server apparatus 1 and the image forming apparatus 2.

Functional Configuration of Server Apparatus 1

Figure 5:
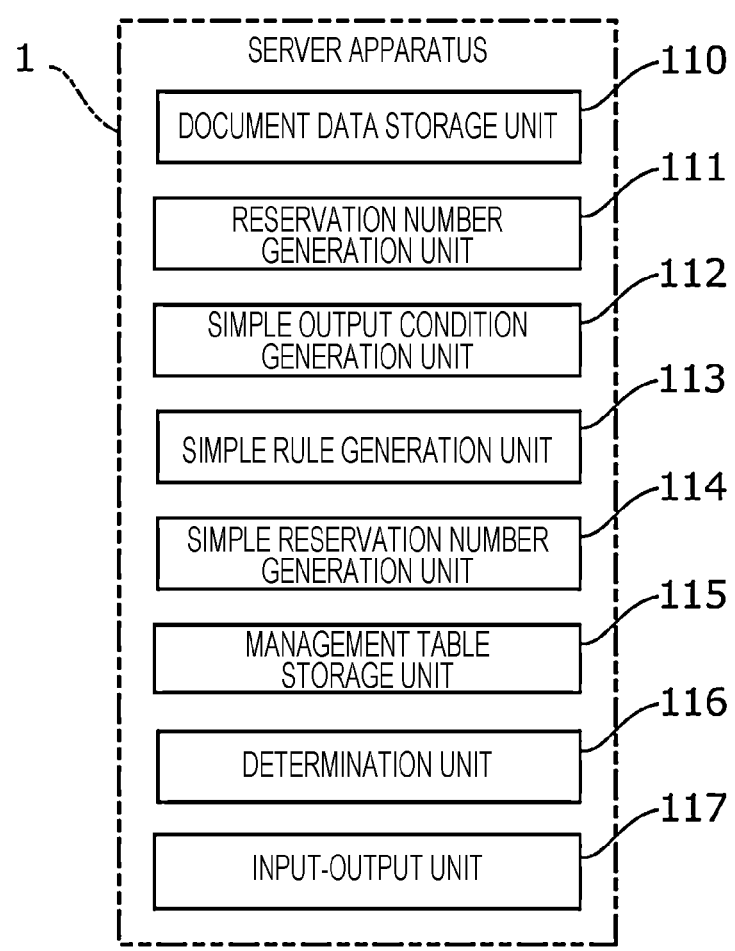
FIG. 5 illustrates an example of the functional configuration of the server apparatus.

FIG. 5 illustrates an example of the functional configuration of the server apparatus 1. The processor 11 of the server apparatus 1 runs a program that is stored in the memory 12 to function as a document data storage unit 110 that stores the document data, a reservation number generation unit 111 that generates the reservation number, a simple output condition generation unit 112 that generates the simple output condition, a simple rule generation unit 113 that generates the simple rule, a simple reservation number generation unit 114 that generates the simple reservation number, a management table storage unit 115 that stores the management table, a determination unit 116 that makes various determinations, and an input-output unit 117 that inputs or outputs various kinds of data via the communication line 4.

Operation

The operation of the information processing system 9 will now be described with reference to FIG. 6 to FIG. 9.

Document Data Register Operation

Figure 6:
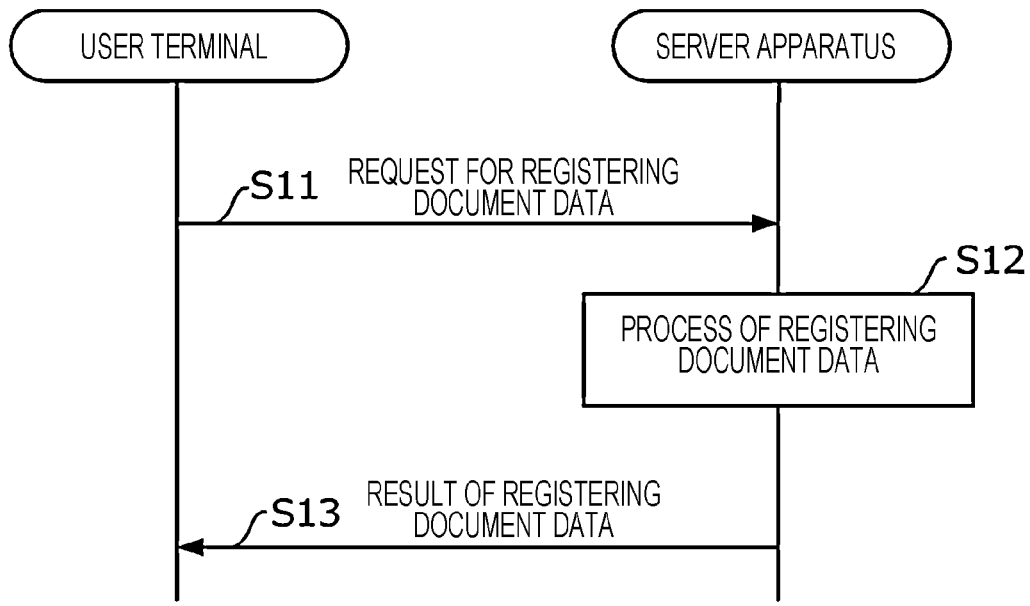
FIG. 6 is a sequence diagram illustrating an example of the operation of the information processing system.

Processing illustrated in FIG. 6 by way of example is performed when the user registers the document data in the server apparatus 1. The processor of the user terminal 3 runs, for example, a program of creating a document in response to the operation of the user and generates the document data. The user specifies the simple output condition and the simple rule and conducts an operation for registering the document data in the server apparatus 1. The processor of the user terminal 3 then requests the server apparatus 1 to register the document data (step S11 in FIG. 6). The request for registering the document data includes the document data ID, the document data, the simple output condition, and the simple rule. The processor 11 of the server apparatus 1 receives the request for registering the document data from the user terminal 3 via the interface 13, stores this, and performs a process of registering the document data illustrated in FIG. 7 by way of example (step S12 in FIG. 6).

Figure 7:
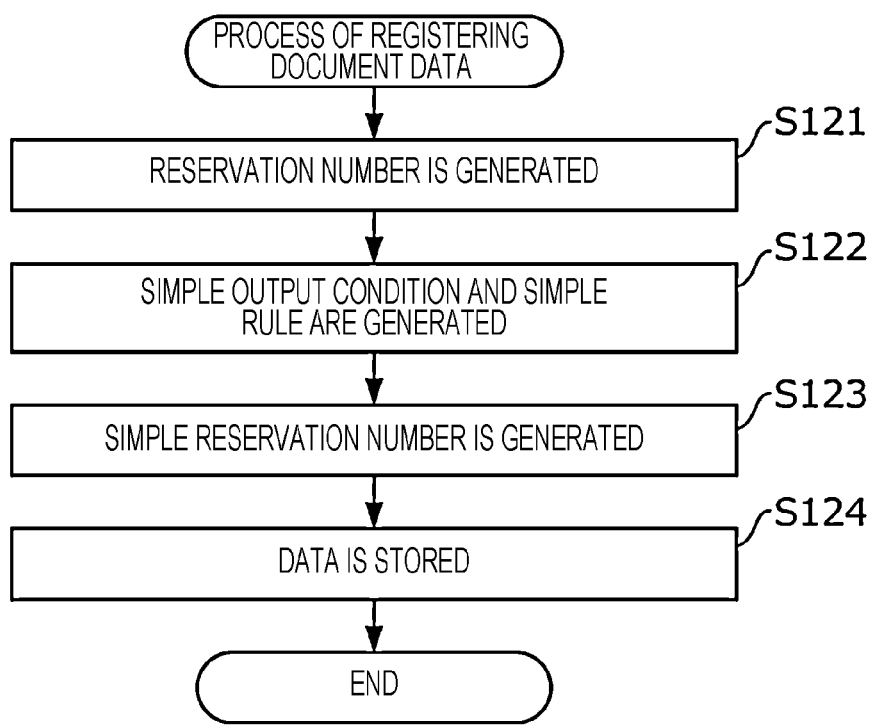
FIG. 7 is a flowchart illustrating an example of the operation of the server apparatus.

In FIG. 7, the processor 11 generates the reservation number that is represented by, for example, a random character string having 13 digits by using the algorithm for generating the reservation number (step S121 in FIG. 7).

Subsequently, the processor 11 generates the simple output condition and the simple rule in accordance with the content of the request for registering the document data. In this example of the operation, the processor 11 uses the simple output condition and the simple rule that are included in the request for registering the document data (step S122 in FIG. 7).

Subsequently, the processor 11 generates the simple reservation number that is represented by, for example, a character string corresponding to the last four digits of the reservation number from the generated reservation number in accordance with the simple rule (step S123 in FIG. 7).

The processor 11 associates the document data ID, the register date and time, the simple output condition, and the simple rule with each other in addition to the reservation number and the simple reservation number and writes and stores these in the management table (step S124 in FIG. 7).

Returning to the description of FIG. 6, the processor 11 of the server apparatus 1 transmits the result of registering the document data to the user terminal 3 via the interface 13 (step S13 in FIG. 6). The result of registering the document data includes the simple output condition, the reservation number, and the simple reservation number that are written in the management table. The user looks at the simple output condition, the reservation number, and the simple reservation number that the user terminal 3 displays and checks the contents thereof.

Document Data Output Operation

Figure 8:
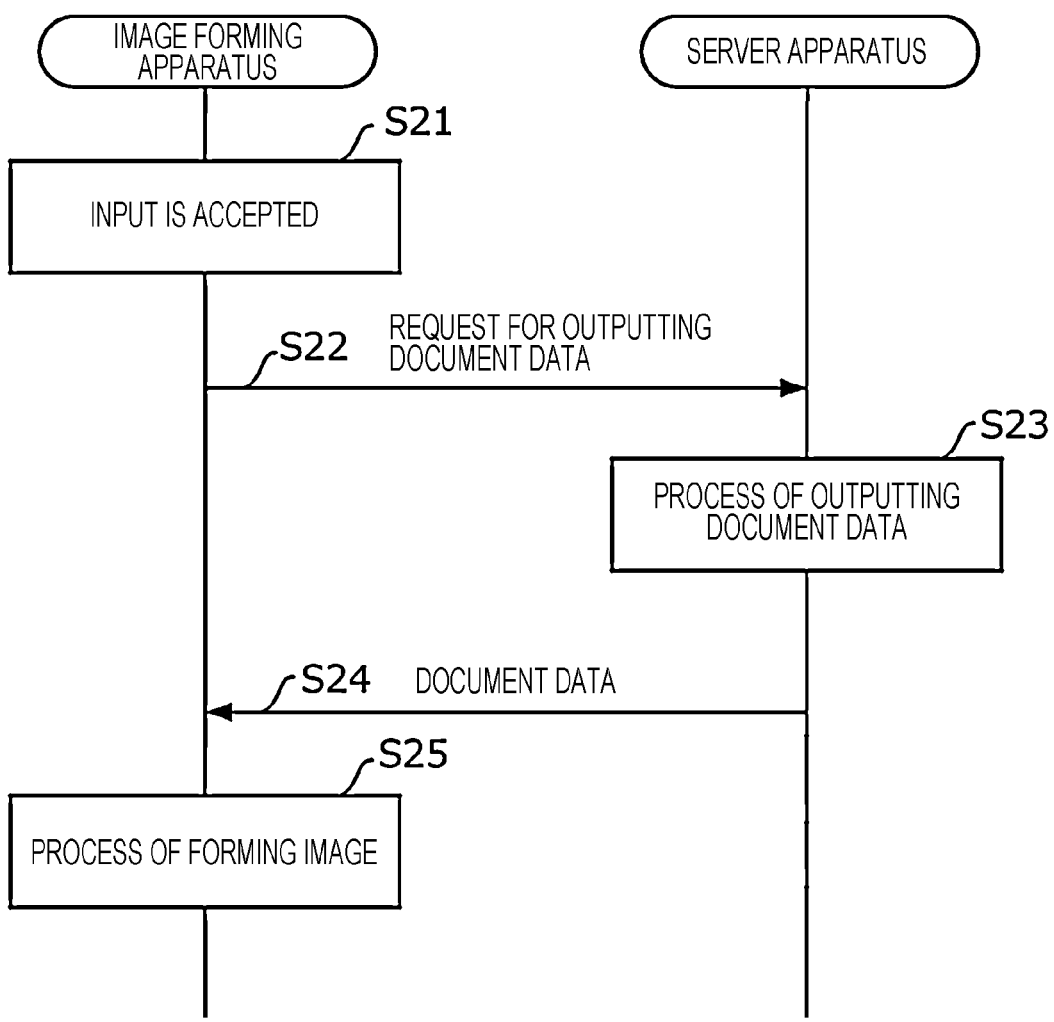
FIG. 8 is a sequence diagram illustrating an example of the operation of the information processing system.

Processing illustrated in FIG. 8 by way of example is performed when the user outputs the document data. The user goes to the location of the image forming apparatus 2 that the user freely selects and inputs the reservation number or the simple reservation number into the image forming apparatus 2. The processor 21 of the image forming apparatus 2 accepts an operation by which the user inputs the reservation number or the simple reservation number (step S21 in FIG. 8).

The image forming apparatus 2 requests the document data from the server apparatus 1 (step S22 in FIG. 8). The request for the document data includes the reservation number or the simple reservation number that is inputted by the user.

Figure 9:
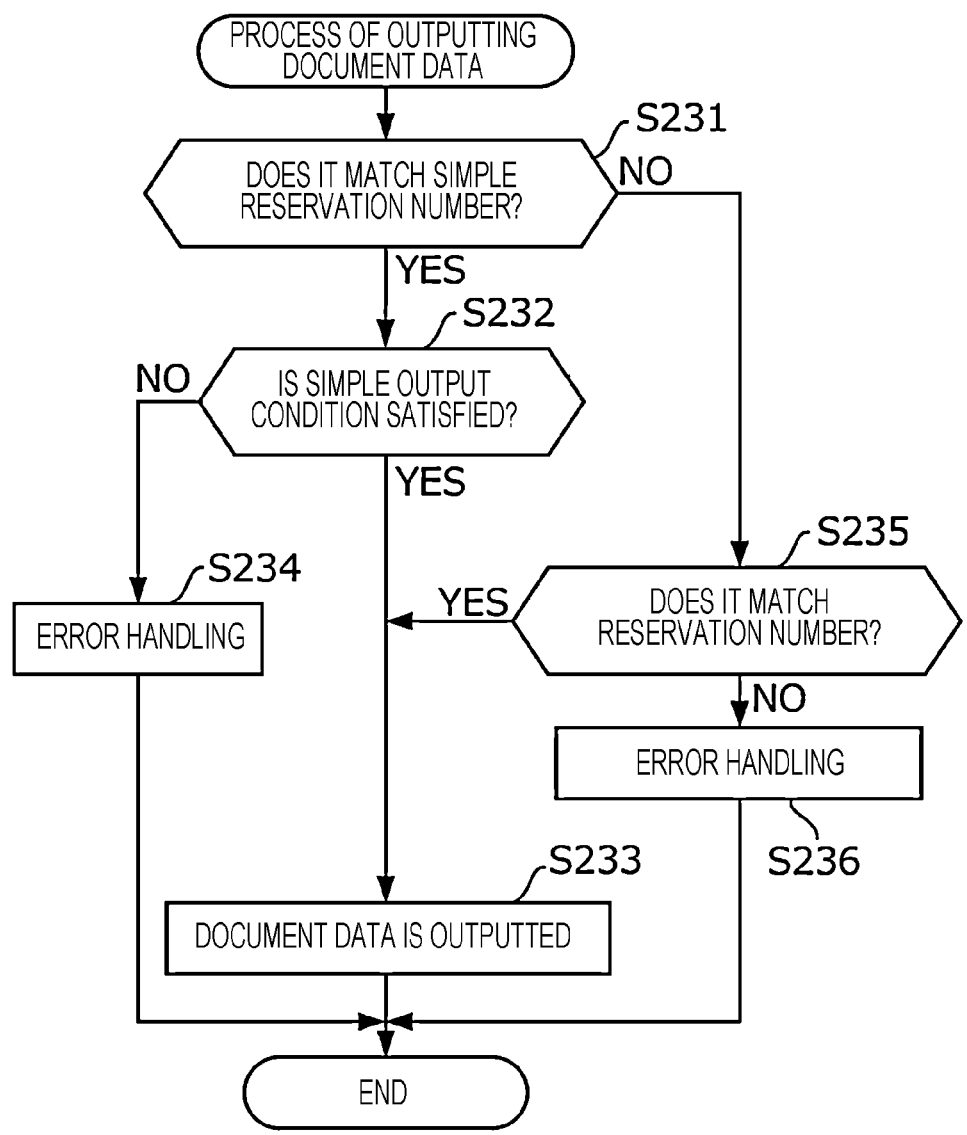
FIG. 9 is a flowchart illustrating an example of the operation of the server apparatus.

The processor 11 of the server apparatus 1 receives the request for the document data from the image forming apparatus 2 via the interface 13 and performs a process of outputting the document data illustrated in FIG. 9 by way of example (step S23 in FIG. 8).

In FIG. 9, when the request for the document data includes the simple reservation number that is represented by a character string having four digits, the processor 11 determines whether the character string having the four digits matches any simple reservation number in a simple reservation number group in the management table (step S231 in FIG. 9).

If there is any simple reservation number that matches the character string (YES at step S231 in FIG. 9), the processor 11 determines whether the simple output condition that is associated with the simple reservation number is satisfied (step S232 in FIG. 9).

If the simple output condition is satisfied (YES at step S232 in FIG. 9), the processor 11 reads the document data of the document data ID that is associated with the simple reservation number described above from the memory 12 and outputs the document data to the image forming apparatus 2 that is the requester of the document data via the communication line 4 (step S233 in FIG. 9 and step S24 in FIG. 8).

If the simple output condition is not satisfied (NO at step S232 in FIG. 9), the processor 11 performs predetermined error handling such that a message that represents the "request is made out of the condition for outputting by using the simple reservation number", for example, is outputted to the image forming apparatus 2 that is the requester of the document data via the communication line 4 (step S234 in FIG. 9).

If the request for the document data does not include the simple reservation number that is represented by a character string having four digits, that is, if the request for the document data does not include the simple reservation number that matches any simple reservation number in the simple reservation number group in the management table (NO at step S231 in FIG. 9), the processor 11 determines whether the reservation number that is included in the request for the document data and that is represented by a character string having 12 digits matches any reservation number in a reservation number group in the management table (step S235 in FIG. 9).

If there is a matching reservation number (YES at step S235 in FIG. 9), the processor 11 reads the document data of the document data ID that is associated with the reservation number from the memory 12 and outputs the document data to the image forming apparatus 2 that is the requester of the document data via the communication line 4 (step S233 in FIG. 9 and step S24 in FIG. 8).

If the request for the document data includes neither the simple reservation number that matches one in the simple reservation number group nor the reservation number that matches one in the reservation number group in the management table (NO at step S235 in FIG. 9), the processor 11 performs predetermined error handling such that a message that represents the "requested document is not found", for example, is outputted to the image forming apparatus 2 that is the requester of the document data via the communication line 4 (step S236 in FIG. 9).

Returning to the description of FIG. 8, the processor 11 of the server apparatus 1 transmits the document data to the image forming apparatus 2 via the interface 13 (step S24 in FIG. 8), and the processor 21 of the image forming apparatus 2 performs a process of forming an image to form the image depending on the document data on the medium (step S25 in FIG. 8).

With the configurations described above, in the case where the simple output condition is satisfied, the input of the simple reservation number will suffice.

Modifications

The exemplary embodiment is described above. The content of the exemplary embodiment, however, may be modified as described below. Modifications described below may be combined with each other.

First Modification

The server apparatus 1 according to the exemplary embodiment described above includes the processor 11 that includes the CPU. However, a control unit that controls the server apparatus 1 may have a different structure. For example, the server apparatus 1 may include various processors other than the CPU.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Second Modification

In the embodiments above, the term "processor" is broad enough to encompass one processor or plural processors in collaboration which are located physically apart from each other but may work cooperatively. The order of operations of the processor is not limited to one described in the embodiments above, and may be changed.

Third Modification

Various conditions are thought as the simple output condition. The simple output condition may be a condition related to the requester of the document data. An example of the condition related to the requester of the document data is an attribute of the user terminal corresponding to the requester or the position thereof. The processor 11 associates the ID of the image forming apparatus 2 and the attribute or the position with each other in advance, acquires the ID of the image forming apparatus 2 that requests the document data together with the request for the document data, and outputs the document data in response to the input of the simple reservation number in the case where the attribute or the position that is associated with the ID satisfies the simple output condition (for example, the image forming apparatus 2 is installed in a department or a store, or the image forming apparatus 2 is located in a range).

Fourth Modification

The simple output condition may be a condition related to an operation of the user who inputs the simple reservation number. The condition related to the operation of the user represents that the user conducts a specific operation before or after inputting the simple reservation number, for example, the user touches four corners of a screen that the image forming apparatus 2 displays in a clockwise order to input the reservation number. The processor 11 acquires the content of the operation together with the request for the document data and outputs the document data in response to the input of the simple reservation number in the case where the content of the operation satisfies the simple output condition. The condition related to the operation of the user may be related to a condition that is not normally satisfied in order to prevent the same operation from being coincidentally conducted.

Fifth Modification

The simple output condition may be a condition related to the number of times the document data is outputted or frequency with which the document data is outputted. Examples of the condition related to the number of times the document data is outputted or frequency with which the document data is outputted include a condition in which the document data is outputted only once and a condition in which the document data is outputted Y times at time X. The processor 11 outputs the document data in response to the input of the simple reservation number in the case where the number of times the document data is outputted or frequency with which the document data is outputted satisfies the simple output condition.

Sixth Modification

The simple output condition may be selected by the user from choices of the simple output condition that are generated by the server apparatus 1. The simple output condition may include multiple contents such as outputting from a "specific image forming apparatus" and "within 30 minutes after the register date and time".

Seventh Modification

Multiple simple reservation numbers that are inputted by different numbers of procedures may be prepared, and multiple simple output conditions may be associated with the respective simple reservation numbers. For example, as for some document data, the simple reservation number for the simple output condition that represents "within 5 minutes after the register date and time" corresponds to the "last two digits of the reservation number", the simple reservation number for the simple output condition that represents "within 30 minutes after the register date and time" corresponds to the "last four digits of the reservation number", and the simple reservation number for the simple output condition that represents "within 1 hour after the register date and time" corresponds to the "last eight digits of the reservation number". The procedure quantity for inputting the simple reservation number is thus decreased as a restriction that is imposed under the simple output condition becomes tighter.

Eighth Modification

The user or administrator may freely specify the simple rule. For example, the "last X digits" and the "first Y digits" are also thought other than the "last four digits" of the reservation number described by way of example according to the exemplary embodiment. A character string that is freely specified by the server apparatus, the user, or the administrator is also acceptable. The user may select the simple rule from choices of the simple rule that are generated by the server apparatus 1.

Ninth Modification

According to the exemplary embodiment described above, the processor 11 uses the simple output condition and the simple rule that are included in the request for registering the document data as they are (step S122 in FIG. 7). However, the simple output condition or the simple rule may be generated without depending on the specification of the user. For example, the processor 11 analyzes the meaning of the ID or content of the document data and generates the simple rule such that in the case where a condition that represents high confidentiality is satisfied, the restriction that is imposed under the simple output condition becomes tighter than that in the case where a condition that represents low confidentiality is satisfied, or the procedure quantity for inputting the simple reservation number increases.

The processor 11 analyzes the attribute of the registrant of the document data and generates the simple rule such that in the case where a condition that represents the registrant (the user) who deals with a highly confidential document is satisfied, the restriction that is imposed under the simple output condition becomes tighter than that in the case where the condition that represents the registrant who deals with a highly confidential document is not satisfied, or the procedure quantity for inputting the simple reservation number increases.

The processor 11 may collect relationships between the ID or content of the document data, or the attribute of the registrant (the user) of the document data and the simple output condition or the simple rule that is specified by the user, may use, as an explanatory variable, the ID or content of the document data or the attribute of the registrant (the user) of the document data that is included in the collection, may perform machine learning by using, as a response variable, the simple output condition or the simple rule that is specified by the user, and may generate an algorithm for deriving the simple output condition or the simple rule from the ID or content of the document data or the attribute of the registrant (the user) of the document data.

Tenth Modification

A program that is run by the processor 11 of the server apparatus 1 according to the exemplary embodiment described above corresponds to an example of a program causing a computer that includes a processor to execute a process including storing document data, a first character string, and a second character string that are associated with each other, the second character string being to be inputted by an operation that has the procedure quantity smaller than the procedure quantity of an operation by which the user inputs the first character string, outputting the document data that is associated with the second character string to the requester of the document data when the second character string is acquired if a predetermined condition is satisfied, avoiding outputting the document data that is associated with the second character string to the requester of the document data when the second character string is acquired if the condition is not satisfied, and outputting the document data that is associated with the first character string to the requester of the document data when the first character string is acquired if the condition is not satisfied. The program may be provided with the program stored in a computer readable storage medium, for example, a magnetic storage medium such as a magnetic tape or a magnetic disk, an optical storage medium such as an optical disk, a magneto-optical storage medium, or a semiconductor memory. The program may be downloaded via a communication line such as the internet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
store document data, a first character string, and a second character string that are associated with each other, the second character string being to be inputted by an operation that has a procedure quantity smaller than a procedure quantity of an operation by which a user inputs the first character string;
acquire a character string from a requester of the document data;
determine whether the acquired character string matches the second character string;
determine whether a predetermined condition is satisfied if the acquired character string matches the second character string;

determine whether the acquired character string matches the first character string if the acquired character string does not match the second character string;

output the document data that is associated with the second character string to the requester of the document data if the acquired character string matches the second character string and the predetermined condition is satisfied; and output the document data that is associated with the first character string to the requester of the document data if the acquired character string does not match the second character string and matches the first character string.

2. The information processing apparatus according to claim 1,
wherein the condition relates to a date or a time on or at which the document data is outputted.

3. The information processing apparatus according to claim 2,
wherein the condition relates to the requester of the document data.

4. The information processing apparatus according to claim 3,
wherein the condition relates to an operation of the user who inputs the second character string.

5. The information processing apparatus according to claim 3,
wherein the condition relates to a number of times the document data is outputted or frequency with which the document data is outputted.

6. The information processing apparatus according to claim 2,
wherein the condition relates to an operation of the user who inputs the second character string.

7. The information processing apparatus according to claim 6,
wherein the condition relates to a number of times the document data is outputted or frequency with which the document data is outputted.

8. The information processing apparatus according to claim 2,
wherein the condition relates to a number of times the document data is outputted or frequency with which the document data is outputted.

9. The information processing apparatus according to claim 1,
wherein the condition relates to the requester of the document data.

10. The information processing apparatus according to claim 9,
wherein the condition relates to an operation of the user who inputs the second character string.

11. The information processing apparatus according to claim 9,
wherein the condition relates to a number of times the document data is outputted or frequency with which the document data is outputted.

12. The information processing apparatus according to claim 1,
wherein the condition relates to an operation of the user who inputs the second character string.

13. The information processing apparatus according to claim 12,
wherein the condition relates to a number of times the document data is outputted or frequency with which the document data is outputted.

14. The information processing apparatus according to claim 1,
wherein the condition relates to a number of times the document data is outputted or frequency with which the document data is outputted.

15. The information processing apparatus according to claim 1,
wherein the second character string is one of a plurality of second character strings, and the second character strings are inputted by different numbers of procedures, and
wherein the condition includes a plurality of conditions that are associated with the respective second character strings.

16. The information processing apparatus according to claim 1,
wherein the processor is configured to generate the condition.

17. The information processing apparatus according to claim 16,
wherein the processor is configured to generate the condition, based on the document data.

18. The information processing apparatus according to claim 16,
wherein the processor is configured to generate the condition, based on an attribute of a registrant of the document data.

19. The information processing apparatus according to claim 16,
wherein the processor is configured to generate the condition by machine learning.

20. A non-transitory computer readable medium storing a program causing a computer to execute a process, the process comprising:

storing document data, a first character string, and a second character string that are associated with each other, the second character string being to be inputted by an operation that has a procedure quantity smaller than a procedure quantity of an operation by which a user inputs the first character string;

acquire a character string from a requester of the document data;

determining whether the acquired character string matches the second character string;

determining whether a predetermined condition is satisfied if the acquired character string matches the second character string;

determining whether the acquired character string matches the first character string if the acquired character string does not match the second character string;

outputting the document data that is associated with the second character string to the requester of the document data if the acquired character string matches the second character string and the predetermined condition is satisfied; and outputting the document data that is associated with the first character string to the requester of the document data if the acquired character string does not match the second character string and matches the first character string.

* * * * *